US006613411B2

(12) United States Patent
Kollaja et al.

(10) Patent No.: US 6,613,411 B2
(45) Date of Patent: Sep. 2, 2003

(54) CONFORMABLE MULTI-LAYER SHEET MATERIALS

(75) Inventors: Richard A. Kollaja, St. Paul, MN (US); Heiner Johannsen, Viersen (DE); Sabine Konrad, Moenchengladbach (DE); Buren R. Ree, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/769,703

(22) Filed: Jan. 25, 2001

(65) Prior Publication Data

US 2002/0136851 A1 Sep. 26, 2002

(51) Int. Cl.[7] .................................. B32B 3/00
(52) U.S. Cl. ..................... 428/40.1; 428/41.3; 428/41.5; 428/41.7; 428/41.8; 428/42.1; 428/343; 428/354; 428/480
(58) Field of Search ............... 428/40.1, 41.3, 428/41.5, 41.7, 41.8, 42.1, 343, 354, 480

(56) References Cited

U.S. PATENT DOCUMENTS

| 2,736,729 | A | 2/1956 | Dexter .................. 260/42 |
| RE24,906 | E | 12/1960 | Ulrich .................. 206/59 |
| 4,181,752 | A | 1/1980 | Martens et al. ............ 427/54.1 |
| 4,418,120 | A | 11/1983 | Kealy et al. ............. 428/343 |
| 4,833,179 | A | 5/1989 | Young et al. ............ 522/183 |
| 4,968,562 | A | 11/1990 | Delgado .................. 428/402 |
| 4,994,322 | A | 2/1991 | Delgado et al. ............ 428/343 |
| 5,034,275 | A | 7/1991 | Pearson et al. |
| 5,141,790 | A | 8/1992 | Calhoun et al. ............. 428/40 |
| 5,209,971 | A | 5/1993 | Babu et al. .................. 428/343 |
| 5,215,826 | A | 6/1993 | Shimanski et al. |
| 5,296,277 | A | 3/1994 | Wilson et al. ................. 428/40 |
| 5,362,516 | A | 11/1994 | Wilson et al. ........... 427/207.1 |
| 5,461,134 | A | 10/1995 | Leir et al. ..................... 582/14 |
| 5,932,319 | A | 8/1999 | Makar et al. |
| 6,183,842 | B1 * | 2/2001 | Shimizu et al. ............. 428/141 |
| 6,387,472 | B1 | 5/2002 | Reck et al. |

FOREIGN PATENT DOCUMENTS

| DE | 44 46 255 A | 6/1996 |
| EP | 0 279 579 B1 | 4/1993 |
| EP | 0 570 515 B1 | 6/1996 |
| EP | 0 617 708 B1 | 9/1996 |
| EP | 0 826 482 A | 3/1998 |
| WO | WO 95/13331 | 5/1995 |
| WO | WO 97/18276 | 5/1997 |
| WO | WO 98/29516 | 7/1998 |
| WO | WO 00/05305 | 2/2000 |

OTHER PUBLICATIONS

*Handbook of Pressure–Sensitive Adhesives*, Ed. D. Satas 2nd Edition, Von Nostrand Reinhold, New York. 1989.
*Encyclopedia of Polymer Science and Engineering*, vol. 13, Wiley–Interscience Publishers, New York, 1988.
*Encyclopedia of Polymer Science and Engineering*, vol. 13, Wiley–Interscience Publishers, New York, 1964.

* cited by examiner

Primary Examiner—Nasser Ahmad
(74) Attorney, Agent, or Firm—Carolyn V. Peters

(57) ABSTRACT

A multi-layer sheet material comprises a film, and adhesive layer and an optional release liner. The film is a polyester blend comprising first and second polyesters that are substantially amorphous and possess certain physical properties including softening temperature, E-modulus, elongation and residual stress.

11 Claims, No Drawings

CONFORMABLE MULTI-LAYER SHEET MATERIALS

TECHNICAL FIELD

This invention relates to conformable multi-layer sheet materials, their method of production and their use as graphic films. The invention is also related to a method of providing a graphic film with a design as well as a method of providing a surface of a substrate with a graphic design.

BACKGROUND OF THE INVENTION

Graphic films are used for example to apply designs, e.g. images, graphics, text and/or information, on windows, buildings, pavements or vehicles such as autos, vans, buses, trucks, streetcars and the like for e.g. advertising or decorative purposes. Many of the surfaces of the mentioned substrates, e.g. vehicles, are irregular and/or uneven, such as rivets overlaying flat surfaces, corrugated panels, curvatures or various surface molding, e.g. body-side, structural or decorative molding.

For graphic films, it is desirable to have a film that accommodates curves, depressions or projections on a substrate surface so that the film may be stretched around curves or projections, or may be pressed down into depressions without breaking or delaminating the film (conformability). It is also desirable to have a film that can be applied over irregular and/or uneven surfaces without subsequent delaminating or releasing from the substrate surface (popping-up). In addition, it is desirable that graphic films are imageable (i.e. have a receptive surface for printing and/or graphics) and exhibit good weathering for outdoor applications.

Polyvinyl chloride (PVC) films are conventionally used for a wide of variety of applications including graphic films. PVC has many properties that are advantageous for such applications. For example, PVC graphic films are conformable to the varying topographies present on the exterior of a substrate, e.g. a vehicle. But PVC films and their use as graphic films suffer from a number of disadvantages. In general, the application of halogen-containing plastics is undesirable for environmental reasons. Another disadvantage of PVC films is the accompanying use of plasticizers in such films. Plasticizers are typically needed in PVC graphic films in order to make the films more flexible and more conformable. However, plasticizers can migrate within the film and such migration can change the performance of the film. Furthermore, such plasticizers may degrade adjacent adhesive layers, reducing the adherence of the film to the surface of the substrate. Another disadvantage of PVC graphic films is that they tend to pop up after application.

Although polyolefin films and their corresponding use as graphic films are advantageous in that they typically do not contain halogen or plasticizers, polyolefin films are difficult to image and thus require the application of an additional image receptive layer, such as an ink receptive layer, toner receptive layer, primer layer or the like. Furthermore, polyolefin graphic films like PVC graphic films show a tendency to pop up.

Popping-up typically results from the presence of residual stress in the graphic film at irregular surface locations during application, which exceeds the holding power of the adhesive. In previous attempts to minimize the problem of popping up, graphic films have been provided with highly tacking adhesives to provide high holding power and/or applied to the substrate surface at relatively high temperatures well above 100° C. in order to try to fully relax the film.

SUMMARY OF THE INVENTION

There is an ongoing need for sheet materials and/or films for use in inter alia graphic applications which may be bonded to uneven and/or irregular surfaces and have a variety of properties not possessed by known products or film materials. There is further a desire to produce such sheet materials in a cost effective and convenient way. It is also preferred that the sheet materials display good printability, are suitable for outdoors usage and conform well to uneven substrate surfaces.

In particular, it is desirable to provide sheet materials, which can be easy to apply under the application of relatively mild heat, i.e. between about 40 and about 80° C., exhibit a low residual stress at such application temperatures and at the same time show good handleability at room temperature.

It has been found that good handleability as well as ease in mild heat-mediated application onto irregular substrate surfaces can be realized by providing a base film for sheet materials comprising a blend comprising at least two substantially amorphous polyesters. In addition, it has been found that films comprising a blend comprising at least two substantially amorphous polyesters have good stress relaxation properties at 60° C., and sheet materials comprising such films show a low tendency towards popping up after application to a substrate surface. Also, such films can be readily printed and applied with a design.

Accordingly, the present invention provides a multi-layer sheet material comprising:
(i) a film of a polyester blend comprising a first and a second polyester, said polyesters being substantially amorphous, such that the film is capable of being softened at temperature in the range of about 40 to about 80° C. and exhibits a E-modulus in the range of 70 to 1000 N/mm² at room temperature, an elongation at break greater than 50% at room temperature and percent residual stress at 60° C. less than 40%, said film having a first major surface and a second major surface;
(ii) an adhesive layer on the first major surface of said film; and
(iii) optionally, a release liner.

The multi-layer sheet materials according to the invention exhibit advantageously excellent handleability similar to vinyl-based films or sheet materials at room temperature (i.e. 23° C., preferably at 50% relative humidity). Further, the multi-layer sheet materials according to the invention can be readily softened under the application of relatively mild heat, for example using a heat gun, and thus can be easily applied to uneven and/or irregular substrate surfaces, for example, by hand or using a standard squeegee. In particular, the film of the multi-layer sheet materials according to the invention does not require the presence of an added plasticizer in order to yield a conformable sheet material. The film is preferably essentially free of any plasticizer. By "essentially free of any plasticizer" is meant that the film contains no more than 0.25% by weight of plasticizer based on the total weight of the film. More preferably the film contains no plasticizer.

The film of the multi-layer sheet materials according to the invention also exhibits good stress relaxation properties at 60° C., and thus, the multi-layer sheet materials according to the invention exhibit an advantageously low tendency to pop up after application to an uneven and/or irregular surface. In particular, the application of highly tacking adhesives is not necessary to minimize popping up, and therefore, weakly adhering, removable and/or repositionable adhesives can be effectively applied. Sheet materials with such adhesives are very desirable for short term or non-permanent applications.

The film of the multi-layer sheet materials according to the invention is generally directly imageable without the additional layers, although image receptivity may be further enhanced through the application of an image receptive layer. In particular, the film of the multi-layer sheet materials according to the invention is advantageously directly imageable by conventional screen printing and electrostatic printing techniques with standard inks and/or toners without applying an additional image receptive layer onto the film surface.

Accordingly, other aspects of the present invention are the use of a multi-layer sheet material according to the invention as a graphic film as well as the provision of an imaged graphic film comprising a multi-layer sheet material according to the invention, wherein the film is imaged.

A further aspect of the invention is a method of providing a graphic film with a design comprising the following steps: (a) providing a multi-layer sheet material according to the invention, and (b) imaging the second major surface of film of the multi-layer sheet material with the design.

The multi-layer sheet materials according to the invention exhibit excellent weathering properties and thus are advantageously suited for outdoor applications.

An additional aspect of the invention is a method of providing a substrate with a graphic design, the method comprising the following steps:

(a) providing a multi-layer sheet material according to the invention;

(b) imaging the second major surface of film of the multi-layer sheet material with a design to form an imaged graphic film; and (c) applying the imaged graphic film to a surface of the substrate.

An alternative method of providing a substrate with a graphic design according to the present invention comprises the step of applying an imaged graphic film according to the invention to a surface of the substrate.

The methods as well as the application of imaged graphic films are particularly advantageous for substrates having an irregular and/or uneven surface. Further aspects of the invention include the provision of an imaged graphic film adhered to a substrate, an imaged graphic film adhered to a substrate, whereby the imaged graphic film is exposed to an outdoor environment, as well as a vehicle comprising an imaged graphic film.

The present invention also provides a method of preparing a multi-layer sheet material, the method comprising the following steps:

(a) providing a film of a polyester blend comprising a first and a second polyester, said polyesters being substantially amorphous, such that the film is capable of being softened at temperature in the range of about 40 to about 80° C. and exhibits a E-modulus in the range of 70 to 1000 N/mm$^2$ at room temperature, an elongation at break greater than 50% at room temperature and percent residual stress at 60° C. less than 40%, said film having a first major surface and a second major surface;

(b) applying an adhesive layer onto the first major surface of the film; and optionally, covering the adhesive layer with a release liner to form the multi-layer sheet material.

WO 00/05305 proposes tape backing compositions comprising a blend of a first polymer and a second polymer both having a melting temperature of at least about 93° C. as well as flexible films comprising such tape backing compositions. For the two polymers, polypropylene, polyethylene, polyester and polyamide polymers are described. However, the disclosed films, which are optimized for crystallinity and are described to be useful for applications involving elevated temperatures, such as auto paint masking tape applications, are heat-resistant to temperatures up to at least 93° C.

DETAILED DESCRIPTION OF THE INVENTION

Multi-layer sheet materials of the present invention comprise a film, an adhesive layer on one major surface of the film; and optionally, a release liner on the adhesive layer.

The film of the multi-layer sheet materials according to the invention comprises a polyester blend comprising a first and a second polyester, said polyesters being substantially amorphous. Substantially amorphous polyesters preferably comprise polyesters having a degree of crystallinity less than 11%, more preferably less than about 6%, even more preferably less than 1%, preferably as determined by Differential Scanning Calorimetry (DSC) as performed according to the test method DIN 53 765. It is most preferred that substantially amorphous polyesters comprise polyesters having a degree of crystallinity of 0%, i.e. polyesters having no measurable melting point up to 150° C., preferably up to 220° C., preferably as determined by DSC as performed according to the test method DIN 53 765.

The physical properties as well as the softening behavior of the film comprising the polyester blends can be effectuated, for example, by appropriate selection of the individual polyesters and/or varying their ratio in the blend.

Preferably the first polyester has a glass transition temperature (Tg) less than 26° C. and the second polyester has a Tg greater than 24° C., preferably as determined by Dynamic Mechanical Thermal Analysis (DMTA) performed according to method described below. More preferably, the first polyester has a Tg in the range of −60° C. to 25° C., most preferably in the range of −50° C. to 25° C. The second polyester has more preferably a Tg in the range of 28° C. to 150° C., most preferably in the range of 30° C. to 100° C.

Any suitable substantially amorphous polyester can be used as the first or second polyester of the blend. Suitable substantially amorphous polyesters include thermoplastic aromatic and/or linear saturated homo- or copolymer polyester resins. More specifically suitable substantially amorphous polyesters having high weight average molecular weight (Mw) are desirable in order to minimize migratory constituents. High Mw polyesters preferably include polyesters having a Mw from about 30,000 to about 150,000, more preferably about 40,000 to about 120,000, most preferably about 50,000 to about 90,000. Examples of suitable polyesters include amorphous polyester resins of commercially available under the series VITEL brand from Bostik, Middleton, Mass., USA like VITEL 1070B, 1750B, and 3300B. Other examples include amorphous polyester resins commercially available under the series DYNAPOL brand from Huls AG, Marl, Germany like DYNAPOL S1313, S1421, S1420, S1606 and S1611.

It is preferred that the first and second polyesters in the blend are compatible (i.e. there is no evidence of gross phase separation of the polyesters to an unaided human eye at room temperature). Preferably the blend exhibits a single Tg or two Tg's at values falling in the range defined by the Tg's of the first and second polyesters.

Preferably, the first polyester is a relatively soft polyester and the second polyester is a relatively hard polyester.

Relatively soft polyesters preferably comprise polyesters having an E-modulus less than 200 N/mm² and/or an elongation at break greater than 350% at room temperature, more preferably an E-modulus less than 100 N/mm² and/or an elongation at break greater than 400%, and most preferably an E-modulus less than 50 N/mm² and/or an elongation at break greater than 500%. Examples of suitable relatively soft polyesters include VITEL 3300B as well as DYNAPOL S1313, S1421 and S1420.

Relatively hard polyesters preferably comprise polyesters having an E-modulus greater than 200 N/mm² and/or an elongation at break less than 350% at room temperature, more preferably an E-modulus greater than 350 N/mm² and/or an elongation at break less than 200%, and most preferably an E-modulus greater than 500 N/mm² and/or an elongation at break less than 50%. Examples of suitable relatively hard polyesters include VITEL 1070B and 1750B as well as DYNAPOL S1606 and S1611.

The film of the multi-layer sheet materials according to the present invention has a percent residual stress at 60° C. less than 40%. Percent residual stress is preferably determined using the test method according to DIN 53 441 as described below.

Percent residual stress is defined as 100 times (the stress at one minute divided by the initial stress at 100% elongation). To further minimize any tendency of the multi-layer sheet material to pop up after application to a substrate surface, the film preferably has a percent residual stress at 60° C. less than 35%, more preferably less than 30%. To even further minimize any tendency of popping up, the film of the multi-layer sheet materials preferably has low percent strain recovery at 60° C., specifically less than 15% and more specifically less than 11%, preferably as determined using the test method according to DIN 53 441 as described below. Percent strain recovery is defined as 100 times ((length at 100% elongation minus the length at 24 hours) divided by the initial length before elongation)). The film preferably has a percent residual stress at room temperature less than about 53%, more preferably less than about 50%, most preferably less than 47%.

The film of the multi-layer sheet materials according to the invention has an E-modulus at room temperature in the range of 70 to 1000 N/mm². E-modulus is preferably determined according to the test method DIN 53 457 as described below. To further enhance handleability at room temperature, it is preferred that the film has an E-modulus at room temperature in the range of about 85 to 700 N/mm², more preferably in the range of 100 to about 550 N/mm². The film of the multi-layer sheet materials according to the invention has an elongation at break greater than 50% at room temperature. Elongation at break is preferably determined according to the test method DIN 53 457 as described below. To even further maximize handleability at room temperature, the film preferably has an elongation at break in the range of 75 to 600%, more preferably in the range of 100 to 550%. Preferably, the thickness of the film is less than or equal to 250 μm. More preferably the film thickness is in the range of 30 to 200 μm, most preferably in the range of 40 to 175 μm.

The film of the multi-layer sheet materials according to the invention can be softened at temperature in the range of about 40 to about 80° C. The capability of softening the film at temperature in the range of about 40 to about 80° C. is preferably evidenced by a percent drop in E-modulus at room temperature to 60° C. of greater than 84%, more preferably greater than 88%, most preferably greater than 92%. Percent drop in E-modulus from room temperature to 60° C. is defined here to 100 times ((E-modulus at room temperature minus E-modulus at 60° C.) divided by E-modulus at room temperature). Preferably the film has an E-modulus at 60° C. less than 25 N/mm², more preferably less than 20 N/mm², most preferably less than 15 N/mm².

In certain situations, it can be advantageous to be able to easily remove a multi-layer sheet material from a substrate surface after application. In order to enhance removability, the film of the multi-layer sheet materials of the present invention preferably has a tensile at break of greater than 7 N/mm² at room temperature, more preferably greater than 9 N/mm² at room temperature; preferably as determined according to test method DIN 53 457 as described below.

Blending of the polyesters is done by any method that results in a substantially homogeneous distribution of the polyesters. The polyesters can be blended using several methods. In particular, the polyesters can be blended by physical means, melt blending or solvent blending.

Physical blending devices that provide dispersive mixing, distributive mixing, or a combination of dispersive and distribution mixing are useful in preparing homogeneous blends. Both batch and continuous methods of physical blending can be used. Examples of batch methods include a rolling mill or a BANBURY brand internal mixer. Examples of continuous methods include single screw extruding, twin screw extruding, disk extruding, reciprocating single screw extruding, and pin barrel single screw extruding.

Also, the polyesters can be melt blended using a batch process such as an internal mixer or preferably using a single screw extruder or twin screw extruder. The polyester blend can also prepared by solvent blending. In this case, the polyesters in the blend should be substantially soluble in the solvents used.

For even greater formulation latitude, the polyester blend may further comprise one or more substantially amorphous polyesters. Suitable substantially amorphous polyesters for use in conjunction with the first and second polyester may the same as those described for the first and second polyesters. It is preferred that the substantially amorphous polyesters in the blend are compatible (i.e. there is no evidence of gross phase separation of the polyesters to an unaided human eye at room temperature). In blends comprising three or more polyesters, the blend preferably exhibits a single Tg or a number of Tg's at values falling in the range defined by lowest and highest Tg among the applied polyesters.

When two substantially amorphous polyesters are used, the first polyester may be present in the blend in amounts of from 30 to 90% by weight and the second polyester in amounts of from 10 to 70% by weight; the percentages of weight being based on total weight of the first and second polyesters in the blend. Preferably, the first polyester is present in amounts of from 35 to 85% by weight, more preferably 40 to 80% by weight; while the second polyester is present preferably in amounts of from 15 to 65% by weight, more preferably 20 to 60% by weight.

For blends containing three or more substantially amorphous polyesters, it is preferred that the total percentage of polyester or polyesters, having a Tg less than 26° C. and/or being a relatively soft polyester in the sense of the present invention, is from 30 to 90% by weight, more preferably 35 to 85% by weight, most preferably 40 to 80% by weight. The total percentage of polyester or polyesters, having a Tg greater than 24° C. and/or being a relatively hard polyester in the sense of the present invention, is preferably from 10 to 70% by weight, more preferably 15 to 65% by weight, most preferably 20 to 60% by weight. The given percentages of weight are based on total weight of the substantially amorphous polyesters in the blend.

Additives, such as pigments, fillers, ultraviolet light absorbers, ultraviolet stabilizers, energy transfer agents, antioxidants, flame retardants and the like, may also be blended into the polyester blend to modify the properties of the film comprising the blend. Each of these additives is used in an amount to produce the desired result. The total concentration of additives is preferably less than 100 parts per hundred parts of resin (phr), more preferably less than 80 phr. Resin is to be understood here as the resin mixture of the substantially amorphous polyesters not including any amorphous polyester component of an optional additive, such as a pigment additive.

Pigments may be used to modify the optical properties of the film such as color, opacity and to improve UV weathering resistance. Suitable pigments include, for example, commercially available pigment-preparations from Clariant Masterbatch GmbH, Lahnstein, Germany under the trade designation RENOL-CT, like RENOL-Weiss CTX 488, which contain granulated pigment in an amorphous polyester and are heat resistant up to at least 300° C. Typically pigments are used in amounts of about 30 to about 70 phr.

Fillers may be used to extend the polymer blend or modify properties of the film, such as to improve tear properties or reduce surface tack of the films. Examples of inorganic fillers include calcium carbonate, silicates, silico-aluminates, mica, graphite, talc and other similar mineral fillers. Other fillers can include particle-type fillers, such as ceramic microspheres, glass or polymeric beads or bubbles, metal particles, fibers and the like. An example of suitable ceramic microspheres includes silica-alumina microspheres having a diameter up to 10 μm commerically available under ZEEOSPHERES brand Ceramic Microspheres from Minnesota Mining and Manufacturing, St. Paul, Minn., USA. Inorganic and/or particle-type fillers are typically used in amounts of about 1 to about 30 phr.

Suitable fillers also include amorphous or semicrystalline polyolefin resins. For semicrystalline polyolefin resin fillers, it is preferred that the resin has a melting temperature (Tm) greater than the application temperature of the multi-layer sheet material, more preferably greater than 80° C. Tm is preferably determined using DSC according to the ASTM D-3418 test method. Examples of suitable polyolefin resin fillers include an ionomer of poly(ethylene-co-methacrylic acid) available under the trade designation SURLYN 8320, an epoxy functionalized ethylene copolymer available under the trade designation ELVALOY PTW and a maleic anhydride graft polyethylene available under the trade designation FUSABOND MB-226B; all from DuPont Company, Wilmington, Del., USA. Typically, polymeric fillers, e.g. polyolefin fillers, are used in amounts of about 1 to about 35 phr.

Although the blend is preferably essentially free of any substantially semicrystalline polyester resin, the blend may comprise a substantially semicrystalline polyester in form of a polymeric filler or a component of an added pigment, provided the desired softening, E-modulus, elongation at break and percent residual stress properties of the film are maintained. For the purposes of this invention, substantially semicrystalline polyester resins preferably comprise polyester resins having a degree of crystallinity greater than 10%, more preferably greater than 5%, most preferably greater than or equal to 1%. By "essentially free of any substantially semicrystalline polyester resin" is meant that the blend contains no more than 4 phr, more preferaby no more than 2 phr, of any substantially semicrystalline polyester resin. Most preferably the blend is free of any substantially semicrystalline polyester resin.

Although the films of the multi-layer sheet materials of the invention exhibit good weathering properties, ultraviolet light absorbers, ultraviolet light stabilizers, energy transfer agents and/or antioxidants may be used to further enhance protection against severe environmental aging caused by ultraviolet light or heat.

Ultraviolet light (UV) absorbers include hydroxyphenyl-benzotriazoles and hydroybenzophenones; an example includes the UV absorber available under the trade designation TINUVIN 327 from Ciba Specialty Chemicals GmbH, D-68623 Lampertheim, Germany. UV stabilizers are commonly hindered amine light stabilizers (HALS); an example included the UV stabilizer available under the trade designation CHIMASSORB 944 from Ciba Specialty Chemicals GmbH, D-68623 Lampertheim, Germany. Energy transfer agents are commonly nickel stabilizers. Antioxidants include, for example, hindered phenols, amines, and sulfur and phosphorus hydroxide decomposers. Typically such additives are used in amounts of about 0.1 to about 2 phr.

Flame retardants may be added to incorporate resistance to flame initiation or flame propagation in the multi-layer sheet materials of the invention. Examples include brominated aromatic compounds, such as decabromodiphenyloxide available under the trade designation DE83R from Great Lakes, W. Lafayette, Ind., USA, antimony compounds, such as antimony trioxide or antimony pentoxide, and aluminum trihydrate, such as that available under the trade designation MICRALATH 1500 from Solem Ind. Norcross, Ga., USA. Other suitable flame retardants include those described in WO 99/28128. Typically, flame retardants are used in amounts of about 1 to about 10 phr.

Films of the multi-layer sheet materials according to the invention can be provided by preparing a polyester blend and subsequently forming a film from the polyester blend. The film can be formed using any conventional method known to those skilled in the art. For example, the film can be formed using melt extrusion techniques.

The film can be formed via continuous processes. Continuous forming methods include drawing the polyester blend out of a heated film die and subsequently contacting the blend to a moving plastic web or other suitable substrate. A related continuous method involves extruding the polyester blend from a film die and cooling the layered product to form a film. Other continuous methods involve directly contacting the polyester blend to a rapidly moving plastic web or other suitable preformed substrate. Using this method, the polyester blend is applied to the moving preformed web using a die having flexible die lips, such as a conventional film or sheeting die. After forming by any of these continuous methods, the films or layers can be solidified by quenching using both direct method (e.g. chill rolls or water baths) and indirect methods (e.g. air or gas impingement).

Although coating out of solvent is not preferred, the films can be formed via coating using a solvent-based method. For example, the polyester blend can be coated by such methods as knife coating, roll coating, gravure coating, rod coating, curtain coating and air knife coating. The coated solvent-based polyester blend is then dried to remove the solvent, preferably at elevated temperatures, such as those supplied by an oven, to expedite drying.

Preferably the film is not oriented after extrusion or casting. However if orientation of the film is desired, it is preferred that the film is simultaneously biaxially oriented to minimize the inclusion of stress into the film.

In the multi-layer sheet materials according to the invention, an adhesive layer is applied to one surface of the film. The adhesive layer may be activated by pressure, heat, solvent or any combination thereof and may be of a type based on a poly-α-olefin, a block copolymer, an acrylate, a rubber/resin or a silicone. When a pressure sensitive adhesive (PSA) layer is used, PSA's useful in the present invention can be self tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0001 to 0.02 g/cm$^2$). The application of the adhesive layer may also be achieved by laminating the film with an adhesive layer, optionally covered by a release liner. When a release liner is used, lamination is typically the preferred way to apply the adhesive layer to the film. The adhesive layer is typically applied as a continuous layer. The adhesive layer typically has a thickness from about 10 to about 100 μm, preferably about 20 to about 60 μm.

Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,5165 (both Wilson et al) and 5,141,790 (Calhoun et al) and WO 96/1687 (Keller et al) and any other type of PSA disclosed in Handbook of Pressure-Sensitive Adhesives, Ed. D. Satas, 2$^{nd}$ Edition, Von Nostrand Reinhold, New York, 1989. Other examples of PSA's are described in U.S. Pat. Nos. Re 24,906 (Ulrich), 4,833,179 (Young et al), 5,209,971 (Babu et al), 2,736,721 (Dester), and 5,461,134 (Leir et al) and in the Encyclopedia of Polymer Science and Engineering, vol. 13, Wiley-Interscience Publishers, New York, 1988, and Encyclopedia of Polymer Science and Engineering, vol. 13, Wiley-Interscience Publishers, New York, 1964. Acrylate-based PSA's which are particularly useful in the present include those described in U.S. Pat. Nos. 4,181,752 (Clemens et al) and 4,418,120 (Kealy et al), WO 95/13331 and in Handbook of Pressure-Sensitive Adhesives, Ed. D. Satas, 2$^{nd}$ Edition.

Preferably the adhesive layer is a weakly adhering or removable adhesive layer. A weakly adhering adhesive typically has a peel strength than less a conventional aggressively tacking PSA, for example a 180° peel strength (from a painted steel substrate employing a peel rate of 30.5 cm/min) of less than 8 N/cm, more particularly less than 6 N/cm. For purposes of this invention, an adhesive is considered to be "removable", if after final application to an intended substrate the sheet material can be removed without damage to the substrate at the end of the intended life of the sheet material at a rate in excess of 25 feet/hour (7.62 meters/hour) by hand with the optional use of heat.

More preferably, the adhesive layer is a repositionable adhesive layer. For the purposes of this invention, "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacking PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The application of a topologically structured adhesive layer or an adhesive layer having at least one microstructured surface is particularly advantageous. Upon application of a multi-layer sheet material comprising such a structured adhesive layer to a substrate surface, a network of channels or the like exists between the multi-layer sheet material and the substrate surface. The presence of such channels or the like allows air to pass laterally through the adhesive layer and thus allows air to escape from beneath the multi-layer sheet material and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive (See EP 0 279 579). Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A multi-layer sheet material comprising such an adhesive layer provides a sheet material that is repositionable when it is laid on a substrate surface (See U.S. Pat. No. 5,296,277). Such an adhesive layer also require a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, using against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organo silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern. Suitable micro-embossed liners and their method of production are described in WO 98/29516. The release liner can have a thickness of 25 to 250 μm, preferably 80 to 120 μm.

A method of preparing a multi-layer sheet material according to the invention comprises following steps:

a) providing a film of a polyester blend comprising a first and a second polyester, said polyesters being substantially amorphous, such that the film is capable of being softened at temperature in the range of about 40 to about 80° C. and exhibits a E-modulus in the range of 70 to 1000 N/mm² at room temperature, an elongation at break greater than 50% at room temperature and percent residual stress at 60° C. less than 40%, said film having a first major surface and a second major surface;

b) applying an adhesive layer onto the first major surface of the film, and optionally covering the adhesive layer with a release liner to form the sheet material.

In an alternative method of the present invention, in step b) one major surface of the adhesive layer is covered with the optional release liner and then adhesive layer is applied onto the first major surface of the film to form the sheet material.

Because the film of the multi-layer sheet material has advantageous conformability, in particular between 40 and 80° C., good stress relaxation at 60° C., and are imageable, the multi-layer sheet materials of the present invention can be advantageously used as graphic films. Due to the above-mentioned desirable properties, an imaged graphic film comprising a multi-layer sheet material according to the invention, wherein the film is imaged is particularly useful in various graphic applications.

A method of providing a graphic film with a design, e.g. an imaged graphic film, comprises the following steps: (a) providing a multi-layer sheet material according to the invention and (b) imaging the second major surface of film of the multi-layer sheet material with the design.

The film of the multi-layer sheet material is advantageously directly imageable by conventional screen printing and electrostatic printing techniques with standard inks and/or toners without applying an additional image receptive layer on the film. Thus in a preferred embodiment, the imaging of step b) is performed by screen printing or electrostatic printing.

If desired, during the imaging step (b), the second major surface of the film of the multi-layer sheet material may be first provided with an image receptive layer and then in a second step the design is printed onto the surface of the image receptive layer. Image receptive surfaces comprise materials that have an affinity for the particular inks, toners or the like to be used. With an image receptive layer, the multi-layer sheet materials of the invention may be used for graphic applications whereby a design is transferred to the film by techniques, which may not be suitable to directly image the film. The application of an image receptive layer may also further enhance imageability of the film with techniques, which were found to be suitable for direct imaging on the film. Besides screen printing and electrostatic printing, other imaging techniques suitable for imaging the film include ink jet printing, thermal mass transfer, flexography, dye sublimation, or other printing processes.

Besides an image receptive layer other functional layers, for example, a light sensitive layer may be employed. Although the application of a protective top coat is not necessary, because the multi-layer sheet materials according to the invention exhibit desirable resistance to scratching and the like, a top coat may also be employed as a functional layer. The top coat may be polymeric, and, for example, may be made of polyurethanes, polycarbonates or polyacrylics.

The film of the multi-layer sheet material may also be treated with a conventional primer coating, and/or activated by flame or corona discharge, and/or by other surface treatment to enhance adhesion of a functional layer and/or the adhesive layer thereto.

Because the film of the multi-layer sheet materials exhibit excellent weathering properties, the multi-layer sheet materials as well as imaged graphic films according to the invention are advantageously suitable for outdoor graphic applications. For example, an imaged graphic film adhered to a substrate is particular advantageous, wherein the imaged graphic film is exposed to an outdoor environment.

A method of providing a substrate with a graphic design comprises the following steps:

(a) providing a multi-layer sheet material according to the invention;

(b) imaging the top surface of film of the multi-layer sheet material with a design to form an imaged graphic film; and (c) applying the imaged graphic film to a surface of the substrate.

An alternative method of providing a substrate with a graphic design comprises the step of applying an imaged graphic film according to the invention to the surface of the substrate.

The application step of the described methods preferably includes the steps of (aa) heating the imaged graphic film and (bb) adhering the imaged graphic film to the surface of the substrate. The steps (aa) and (bb) may be performed in any order or simultaneously. Preferably, the imaged graphic film is heated and then said film is adhered to the surface of the substrate, more preferably the imaged graphic film is heated as said film is adhered to the surface of the substrate. The heated imaged graphic film can be easily conformed to the contours of the surface of the substrate by stretching the film around curves or projections and/or pressing the sheet material down into depressions. Preferably, the heating is performed at a temperature of up to about 80° C., more preferably at a temperature of about 40° C. to about 80° C. Because the imaged graphic films adhered to a substrate exhibit a low tendency towards popping up, the described methods and the adhered graphic films are especially desirable for substrates having an irregular and/or uneven surface, in particular a vehicle, a window, a building, or pavement, more particularly a vehicle.

Multi-layer sheet materials and films applied in multi-layer sheet materials are exemplified in the following examples. These examples are merely for illustrative purposes only and are not meant to be limiting in regard to the scope of the claims.

All parts, percentages, ratios, etc. in the examples and the rest of the specification are by weight unless indicated otherwise.

Test Methods

A. Characterization of Polyesters

1. Characterization by Dynamic Mechanical Thermal Analysis (DMTA)

Pellets of the polyester resins employed were pressed into films using a heated platten press. The polymer samples were then evaluated using a dynamic mechanical thermal analysis apparatus, Polymer Laboratories DMTA, Model MK II, available from Rheometrics Scientific, Piscataway, N.J., USA. Two strip of polymeric film were then cut out and evaluated in the tensile mode (static force tracking dynamic force). Plots of storage modulus (G') versus temperature, loss modulus (G") versus temperature, and shear tan δ (delta) (G"/G') versus temperature were measured between −50° C. and 150° C. using a heating rate of 2° C./min, a frequency of 1 Hz and a strain of 0.1%.

2. Glass Transition Temperature, $T_g$, by DMTA

DMTA can be used to measure the glass transition temperature(s) of a polymer. The temperature at which a peak appears in the shear tan δ plot vs. temperature plot indicates the presence of a glass transition point.

3. Melting Point by Differential Scanning Calorimetry (DSC)

Differential Scanning Calorimetry (DSC) was employed in attempts to identify a melting point indicative of crystallinity in the polyester. Scans were conducted up to 150° C. according to Deutsche Industrie Norm (DIN) 53 765 (equivalent to ASTM D 3418) using a Model DSC 7 from Perkin Elmer, employing a Pyris™ software package, Version 3.41.

4. E-Modulus and Elongation at Break

Films of the polyesters were prepared by extrusion where possible. E-modulus and elongation of break of the polyester films was then measured using the method described below for polymeric films.

B. Characterization of Polymeric Films

1. Tensile Strength and Elongation at Break, 23° C. and 60° C.

Tensile strength and elongation at break of extruded polyester-based polymeric films was measured according to DIN (Deutsche Industrie Norm) 53 457 using a commercially available tensile tester available as Model 1446 from Zwick GmbH (Ulm, Germany) employing a software package testXpert™, Version 5.01, with the following exceptions:

2.2 Tension on the sample was not related to the smallest cross-sectional area of the original sample, but was related to the average cross-sectional area of the original sample.

5.1 Test specimens were prepared by cutting film samples having their length in the machine direction. The film strips were uniformly 2.54 cm wide, rather than the "dog-bone" shape traditionally employed. The ends of the strips to be clamped in the tester jaws was wrapped with paper-based adhesive tape commonly employed for paint masking available as #220 Masking Tape from 3M Company, St. Paul, Minn., USA, so that 50 mm of specimen length was present between the taped ends.

5.2 The sample strip had a total length of 90 mm comprising 50 mm free sample and 20 mm covered with tape on each end.

8.0 Five samples were measured and the values averaged.

8.1 The thickness of the film samples was measured in three places and averaged. Thicknesses in the range of 50 to 150 μm were measured and variations of up to 10% were found.

8.2 The jaws of the tester were separated at a rate of 305 mm/min (12 inches/min).

Tensile strength and elongation at break measurements were made at 60° C. by placing the samples area and jaws of the tensile tester in a forced air oven held at 60° C. The sample was conditioned in a heated chamber held at 60° C. for 5 minutes before testing.

2. E-Modulus, 23° C. and 60° C.

E-Modulus was measured according to DIN (Deutsche Industrie Norm) 53 457. The modulus between 0.5% and 1.0% elongation was recorded as the E-modulus. Test specimens were prepared in the manner described above for tensile strength and elongation at break. The speed at which the jaws were drawn apart for the modulus test was 5 mm/min.

E-modulus measurements were made at 60° C. by placing the samples area and jaws of the tensile tester in a forced air oven held at 60° C. The sample was conditioned in a heated chamber held at 60° C. for 5 minutes before testing.

The E-modulus of the films was measured on five different specimens, at 23° C. and 60° C., respectively, and recorded in $N/mm^2$.

3. Percent Residual Stress, 23° C. and 60° C.

Residual stress at 1 min was determined according to DIN (Deutsche Industrie Norm) 53 441 by elongating a film test specimen to twice its original length (100% elongation) and allowing it to relax while still held in the jaws of the test equipment. The tensile stress after 1 minute was divided by the original tensile stress after 100% elongation, and then expressed as percent.

The 100% elongation was performed at 305 mm/min (12 inches/min).

Percent residual stress was evaluated in a controlled environment at 23° C. and 50 percent relative humidity. A separate set of measurements was made at 60° C. by placing the jaws and sample area of the tensile tester in a 60° C. forced air oven. Both the stretching and relaxation phases of the test were performed at 60° C.

4. Percent Strain Recovery, 23° C. and 60° C.

Strain recovery was measured according to DIN (Deutsche Industrie Norm) 53 441. Sample preparation was the same as for tensile and elongation described above.

The length of the specimen was measured before strain (100 mm) at both 23° C. and 60° C. The length of the specimen was measured at 100% elongation (200 mm) at both 23° C. and 60° C., respectively. In each case, after the extension to 200 mm, the specimen was removed from the tensile tester and placed in a controlled environment at 23° C. and 50% relative humidity for 24 hours. After 24 hours, its length between the taped ends was measured again using a ruler. The difference between the length at 100% elongation (200 mm) and the length after 24 hours was calculated. This number was divided by the original length (100 mm) and expressed in percent.

5. Percent Drop in E-modulus between 23° C. and 60° C.

Percent drop in E-modulus between 23° C. and 60° C. was determined by first measuring the E-modulus at both temperatures by the method defined above and calculating $$(\text{E-modulus at } 23° C. - \text{E-modulus at } 60° C.)/\text{E-modulus at } 23° C.$$

and then expressing in percent.

C. Adhesive-Coated Polymeric Films

1. Pop-Up Resistance on Corrugated Panel

Adhesive-coated polymeric films as prepared in the examples were cut into sheet-sized samples of 30 mm×50 mm. The liner was removed from the pressure-sensitive adhesive coating and the exposed adhesive surface pressed against a corrugated steel panel which had been painted with a paint system designed for automotive use. The fully dried and cured paint system on the corrugated steel panel comprised a colored opaque base-coat and a colorless clear top-coat. The corrugated panel had trench-like depressions running across its entire length. The depth of the trenches was ca. 2 cm. The trenches present on a single test panel had varying amounts of slope in the walls, ranging from 105° (slightly less than vertical) to a more gentle slope of 130°. The geometry of the test panel was configured so as to mimic various contours of painted steel encountered in automotive bodywork commonly present on panel trucks and vans.

The adhesive-coated polymeric films were applied to the corrugated panel specifically according to the instructions provided in Instruction Bulletin 5.32 "Converting and Application of 3M SC1100 Graphic Marking Film for Contours" available from 3M Company. St. Paul, Minn., USA with the exception that no application tape was employed. In general, the application procedure involved heating the polymeric film with a hot air gun as it was applied to the surface, depressing the heated film into the contours and adhering it to the floors of the depressed areas while at the same time smoothing it into place by with a hand protected by a clean cotton glove. Panels with adhered polymeric films were allowed to remain at 23° C. and 50% relative humidity for 5 months and then examined for lifting of the polymeric film from depressed surfaces to which it had been adhered.

8 Pop-Up Resistance on Simulated "Ashtray"

Black acrylo-nitrile-butadiene-styrene (ABS) polymer was injection-moulded to form a 3 mm thick panel (20 cm×13 cm) bearing a depression resembling an ashtray or a depression in an automotive door panel under a door handle. The edges of the depression were rounded on two opposing sides and straight across on the other two opposing sides. The walls of the depression were 3 cm deep, extending towards the floor of the depression at an angle of ca. 45°. The floor of the depression was 4 cm square with slightly rounded corners.

Adhesive-coated polymeric films were applied to the panel by the method described above for the corrugated panel. Adhered polymeric films were allowed to rest at 23° C. Visual observations were then made over time to determine whether the adhesive-coated polymeric films had separated and/or lifted from the contoured panel, especially in the area where the walls and the floor of the depression intersect.

Materials Employed in the Examples a. Polyesters

VITEL 1070 Thermoplastic, high molecular weight, aromatic, linear, saturated, hard amorphous copolyester resin available from Bostik, Middleton, Mass./USA. Glass transition temperature, Tg, as measured by the Dynamic Mechanical Thermal Analysis (DMTA) method described above, 77.6° C. No melting point indicative of crystallinity could be detected by Differential Scanning Calorimetry (DSC) up to 150° C. Elongation at break and E-modulus could not be measured on extruded films because a film could not be extruded using the methods employed. The resin manufacturer Bostik reports an elongation at break of 8% measured by ASTM D 638-89, Type I, compression molded and annealed 2 hours at 100° C.) in the product brochure. Intrinsic viscosity =0.66. $M_w$=61,000

VITEL 1750 Thermoplastic, high molecular weight, linear, saturated hard, amorphous copolyester resin available from Bostik, Middleton, Mass. USA. Glass transition temperature, Tg, as measured by the DMTA method described above, 35.8° C. No melting point could be detected by DSC up to 150° C. Elongation at break (23° C.) and E-modulus (23° C.) as measured by the method cited above under Test Methods were 3% and 591 N/mm², respectively. Intrinsic viscosity=0.90. $M_w$=70,000.

VITEL 3300 Thermoplastic, high molecular weight, aromatic linear saturated, soft, amorphous polyester resin available from Bostik, Middleton, Mass./USA. Flexible and slightly tacky at room temperature. Glass transition temperature, Tg, as measured by the DMTA method described above, 21.5° C. No melting point could be detected by DSC up to 150° C. Elongation at break (23° C.) and E-modulus (23° C.) as measured by the method cited above under Test Methods were 535% and 30 N/mm², respectively. Intrinsic viscosity=0.80. $M_w$=63,000 and $M_N$=33,000.

b. Polymeric Additives

SURLYN 8320 Thermoplastic, ethylene/methacrylic acid (E/MAA) copolymer in which the MAA acid groups have been partially neutralized with sodium ions available from DuPont de Nemours Int'l. S.A., Geneva, Switzerland. Melt flow index in g/10 min=1 (ASTM D-1238, conditions E (weight of 2.16 kg)).

ELVALOY PTW Ethylene/glycidyl methacrylate/n-butyl acrylate terpohner copolymer available from DuPont de Nemours Int'l. S.A., Geneva, Switzerland. Melt index in dg/min (ASTM D 1238)=12. Glycidyl methacrylate content of ca. 5% as determined by Fourier Transform Infrared Spectroscopy (FT-IR).

FUSABOND MB226D Maleic anhydride grafted polyethylene available from DuPont de Nemours Int'l. S.A., Geneva, Switzerland. Melt flow rate=1.5 g/10 min (AWSTM Ddd-1238 19=° C./2.16 kg). Melting point=122° C. (ASTM D 3418).

c. Fillers

Titanium dioxide paste Titanium dioxide (Pigment white 6) dispersed at 70% by weight in amorphous polyester, available as Renol Weiss CTX 488 from Clariant Masterbatch GmbH, Lahnstein, Germany.

Calcium carbonate Ground calcium carbonate with a particle size of 2 µm, untreated, water content of <2%. Available as HUBERCARB Q2 from J. M. Huber Corporation, Atlanta, Ga., USA Ceramic microspheres Silica-alumina ceramic microspheres available from 3M Company, St. Paul, Minn., USA as 3M Zeeospheres™ Ceramic Microspheres, Type G-200, density=2.5 g/cc, 90% by volume with a diameter of less than 10 µm.

d. Other additives

Tinuvin 327 UV stabilizer comprising a red-shifted benzotriazole UV absorber (2,4-di-tert-butyl-6-(5-chlorobenzotriazol-2-yl) phenol, $M_w$=357.9, available from Ciba Specialty Chemicals GmbH, Lampertheim, Germany.

Chimasorb 944 Oligomeric hindered amine light stabilizer (HALS), poly[[6-[(1,1,3,3-tetramethylbutyl)amino]-1, 3,5-triazine-2,4-diyl][(2,2,6,6-tetramethyl-4-piperidinyl) imino]-1,6-hexanediyl[2,2,6,6-tetramethyl-4-piperidinyl) imino]]) available from Ciba Specialty Chemicals GmbH, Lampertheim, Germany.

EXAMPLES

Example 1

In Example 1, Vitel™3300, Vitel™1070 polyester resins were fed into a 30 mm diameter twin screw extruder at a weight ratio of 80:20 for a total of 100 parts. Vitel™3300 is a thermoplastic, high molecular weight, aromatic linear saturated, soft, amorphous polyester resin available from Bostik, Middleton, Mass./USA. Vitel™1070 is a thermoplastic, high molecular weight, linear, saturated hard, amorphous copolyester resin available from Bostik, Middleton, Mass./USA.

Additives were mixed with the resins in the extruder in amounts based on 100 parts of polyester resins. The additives Tinuvin 327 (a UV stabilizer comprising a red-shifted benzotriazole UV absorber (2,4-di-tert-butyl-6-(5-chlorobenzotriazol-2-yl) phenol, $M_W$=357.9, available from Ciba Specialty Chemicals GmbH, Lampertheim, Germany), and Chimasorb 944 (an oligomeric hindered amine light stabilizer (HALS), poly[[6-[(1,1,3,3-tetramethylbutyl) amino]-1,3,5-triazine-2,4-diyl][(2,2,6,6-tetramethyl-4-piperidinyl)imino]-1,6-hexanediyl[2,2,6,6-tetramethyl-4-piperidinyl)imino]]) available from Ciba Specialty Chemicals GmbH, Lampertheim, Germany) were added in the amounts of 0.5 phr and 0.5 phr, respectively, based on 100 parts polyester resin.

The extruder was a filly intermeshing co-rotating twin-screw extruder Model ZSK commercially available from W & P Corporation, Ramsey, N.J., USA. The extruder had an inside diameter of 25 mm and a length to diameter ratio (L/D) of 46:1. The extruder barrel was heated in eleven variable zones with the temperature of the first five zones (most remote from the die) progressively increasing in temperature from 90° C. to 200° C. Zones 6–11 were held at 200° C. A screw speed of 425 rpm was used to form a melt blend. The melt blend was then continuously discharged to a melt pump and fed to a single layer, 25 cm wide slot die and extruded to form a film. The die gap was set at ca. 1 mm.

The film extrudate was cast onto a silicone-coated paper liner supported by a rotating chilled roll. The film then was rolled up with the liner. The thickness of the polyester film thus prepared was 75 μm. Chemical composition of the film of Example 1 is summarized in Table 1.

The polymeric film was tested after a period of three to five days to determine its tensile strength, elongation at break and E-modulus, using the techniques described under Test Methods. Residual stress measurements and strain recovery were also measured. Tests were performed at 23° C. and at 60° C. to determine the behavior of the film when it is heated and thus evaluating the ability of a heated film to be conformed to an irregular surface and it tendency to return to its original dimension after cooling. The film test results are summarized in Table 2.

An adhesive-coated polymeric film was prepared by taking the polyester film just described and laminating it to a 35 μm thick acrylic transfer tape prepared by solvent-coating a pressure-sensitive adhesive onto a siliconized liner. The pressure-sensitive adhesive transfer tape comprised a single layer of a copolymer of 2-methylbutyl acrylate (2-MBA) and acrylic acid (AA) in a weight ratio of 90 to 10 and having an inherent viscosity of ca. 0.8 and a bisamide-based thermal crosslinker. Lamination of the adhesive layer to the polyester film surfaced was performed by hand using a rubber-coated roller. The 180° peel force for removal of such adhesive-coated films from a painted steel substrate (described above) is ca. 7.1–7.9 N/cm (18–20 N/inch) employing a peel rate of 30.5 cm/min (12 inch/min).

The adhesive-coated polymeric film was then tested for its ability to resist popping off after having been applied to irregularly-shaped surface after extended periods of time.

Examples 2–5

The two polyester resins used in combination in Examples 1 were compounded with titanium dioxide (in the amounts shown in Table 1) provided as a dispersion in an amorphous polyester resin, available as Renol Weiss CTX 488 from Clariant Masterbatch GmbH, Lahnstein, Germany. Properties of the pigmented polymeric films are shown in Table 2.

TABLE 1

Polymeric Film Compositions Vitel 3300/Vitel 1070

| Example | Polyester 1 Type | Wt % | Polyester 2 Type | Wt. % | TiO$_2$ pigment in amorph. polyester, phr |
|---|---|---|---|---|---|
| 1 | Vitel 3300 | 80.0 | Vitel 1070 | 20.0 | — |
| 2 | Vitel 3300 | 65.4 | Vitel 1070 | 34.6 | 42.0 |
| 3 | Vitel 3300 | 71.4 | Vitel 1070 | 28.6 | 42.9 |
| 4 | Vitel 3300 | 71.5 | Vitel 1070 | 28.5 | 66.7 |
| 5 | Vitel 3300 | 54.5 | Vitel 1070 | 45.5 | 41.0 |

TABLE 2

Polymeric Film Properties Vitel 3300/Vitel 1070

| Ex. | Tens. 23° C., N/mm$^2$ | Elong. 23° C., % | E- mod, 23° C., N/mm$^2$ | Resid. stress, 23° C., % | Strain rec. 23° C., % | Ten. 60° C., N/mm$^2$ | Elong. 60° C., % | E-mod, 60° C., N/mm$^2$ | Resid. stress, 60° C., % | Strain rec. 60° C., % | Drop in E-mod., % |
|---|---|---|---|---|---|---|---|---|---|---|---|
| 1 | 11.6 | 342 | 173 | 35 | 85 | >1.7 | >500 | 1 | 23 | 0 | >99 |
| 2 | 20.3 | 301 | 233 | 44 | 61 | 0.1 | 298 | 2 | 6 | 1 | >99 |
| 3 | 12.9 | 255 | 101 | 38 | 73 | 0.1 | 410 | 3 | 10 | 1 | 97 |
| 4 | 11.8 | 263 | 134 | 40 | 66 | 0.1 | 310 | 4 | 20 | 4 | 97 |
| 5 | 12.6 | 120 | 519 | — | — | 0.7 | 234 | 10 | 13 | 3 | 98 |

Examples 6–12

Examples 6–12 show further examples employing the two polyester resins of Examples 1-5. Polymeric additives and inorganic or particle-type fillers were introduced into the extruder and melt mixed with the polyesters in the amounts shown in Table 3. Three polymeric additives and two inorganic fillers were utilized.

Compositions of the polymeric films are shown in Table 3. Physical properties of the polymeric films are summarized in Table 4.

TABLE 3

Polymeric Film Composition Vitel 3300/Vitel 1070 plus additives

| Ex. | Polyester 1 Type | Wt. % | Polyester 2 Type | Wt. % | TiO₂ Pigment phr | Polymer Additive Type | phr | Other Filler Type | phr |
|---|---|---|---|---|---|---|---|---|---|
| 6 | Vitel 3300 | 64.3 | Vitel 1070 | 35.7 | 50.0 | Surlyn | 16.7 | | |
| 7 | Vitel 3300 | 64.8 | Vitel 1070 | 35.2 | — | Surlyn | 9.9 | | |
| 8 | Vitel 3300 | 66.7 | Vitel 1070 | 33.3 | — | Elvaloy | 23.5 | | |
| 9 | Vitel 3300 | 65.4 | Vitel 1070 | 34.6 | 35.0 | Elvaloy | 10.0 | | |
| 10 | Vitel 3300 | 65.4 | Vitel 1070 | 34.6 | 35.0 | — | — | CaCO₃ | 10.0 |
| 11 | Vitel 3300 | 65.4 | Vitel 1070 | 34.6 | 35.0 | — | — | Ceram. spheres | 10.0 |
| 12 | Vitel 3300 | 65.4 | Vitel 1070 | 34.6 | 35.0 | Elvaloy | 3.0 | Fusabond | 7.0 |

TABLE 4

Polymeric Film Properties Vitel 3300/Vitel 1070 plus additives

| Ex. | Tens. 23° C., N/mm² | Elong. 23° C., % | E-mod 23° C., N/mm² | Resid. stress 23° C., % | Strain rec. 23° C., % | Tens. 60° C., N/mm² | Elong. 60° C., % | E-mod 60° C., N/mm² | Resid. stress 60° C., % | Strain rec., 60° C., % | Drop in E-mod., % |
|---|---|---|---|---|---|---|---|---|---|---|---|
| 6 | 15.1 | 255 | 218 | 45 | 56 | 0.3 | 227 | 4 | 17 | 6 | 98 |
| 7 | 15.1 | 331 | 284 | 33 | 39 | — | >500 | 8 | 27 | 8 | 97 |
| 8 | 23.6 | 517 | 189 | 41 | 47 | — | >500 | 11 | 33 | 8 | 94 |
| 9 | 19.2 | 363 | 159 | 44 | 58 | 0.2 | 317 | 5 | 16 | 10 | 97 |
| 10 | 16.8 | 252 | 331 | 43 | 63 | 0.1 | 339 | 3 | 5 | 1 | >99 |
| 11 | 16.5 | 243 | 272 | 42 | 61 | 0.1 | 246 | 2 | 6 | 1 | 98 |
| 12 | 18.9 | 322 | 250 | 46 | 59 | 0.2 | 227 | 12 | 8 | 3 | 95 |

Examples 13–15

A mixture of two polyesters was extruded into a film as described in Example 1. Vitel™3300 was combined with Vitel™1750 in amounts of 40:60, 60:40 and 80:20 weight ratios in Examples 13–15, respectively. Polymeric film compositions are summarized in Table 5 and properties of the films are shown in Table 6.

Example 16

Example 16 comprised a polyester resin composition similar to that of Example 14. TiO₂ pigment in amorphous polyester was added, in addition to the 100 parts total polyester resin, in the amount of 53.8 phr. Film composition is summarized in Table 5 and properties of the films in Table 6.

TABLE 5

Chemical Composition of Polymeric Films of Vitel 3300/Vitel 1750

| Ex. | Polyester 1 Type | Wt. % | Polyester 2 Type | Wt. % | TiO₂ Pigment in amorphous polyester, phr |
|---|---|---|---|---|---|
| 13 | Vitel 3300 | 40 | Vitel 1750 | 60 | — |
| 14 | Vitel 3300 | 60 | Vitel 1750 | 40 | — |
| 15 | Vitel 3300 | 80 | Vitel 1750 | 20 | — |
| 16 | Vitel 3300 | 59.7 | Vitel 1750 | 40.3 | 53.8 |

TABLE 6

Properties of Polymeric Films of Vitel 3300/Vitel 1750

| Ex. | Tensile 23° C., N/mm² | Elong 23° C., % | E-mod. 23° C., N/mm² | Resid stress, 23° C., % | Strain rec., 23° C., % | Tensile 60° C., N/mm² | Elong 60° C., % | E-mod. 60° C., N/mm² | Resid. stress 60° C., % | Strain rec., 60° C., % | Drop in E-mod., % |
|---|---|---|---|---|---|---|---|---|---|---|---|
| 13 | 10.5 | 429 | 394 | 32 | 92 | >1.4 | >500 | 1 | 24 | 6 | >99 |
| 14 | 12.2 | 479 | 261 | 34 | 90 | — | >500 | 1 | 38 | 10 | >99 |
| 15 | 11.0 | 461 | 126 | 40 | 90 | >2.1 | >500 | 1 | 19 | — | >99 |
| 16 | 11.6 | 342 | 130 | 38 | 67 | 0.1 | 442 | 3 | 15 | 0 | 98 |

Comparative Examples 1–3

Comparative Examples were prepared by the same extrusion technique as employed in Example 1. Each of the Vitel™ polyesters used in the Examples was taken alone, in Comparative Examples 1–3, respectively. Compositions of the films of the Comparative Examples are shown in Table 7. Properties of the polyester films were evaluated by the same methods employed for the polymeric films of the Examples and are summarized in Table 8.

Comparative Example 1 comprising 100% Vitel 3300 produced an extruded film with a very low E-modulus at 23° C. and thus the film was very difficult to handle at ambient temperatures.

Comparative Example 2 is intended to represent 100% Vitel 1070. The polymer was too brittle to extrude under conditions employed in the Examples, however. Thus the material could not be used alone to produce a self-supporting film and was thus not useful for the purposes of the present invention.

Comparative Example 3 comprised an extruded film of Vitel 1750. A film could be extruded, but the measured elongation at break of only 3% rendered it too brittle for use as envisioned.

Comparative Example 4

A polymeric film was prepared from a 80:20 wt:wt mixture of Vitel™1070 and Vitel™1750 using the process described in Example 1. The film exhibited an elongation at break of only 1% and thus this material was also unsuitable

Comparative Example 5a

Comparative Example 5a was prepared by extruding a film comprising a mixture of 55.23% polypropylene resin (available as Fina 3576X polypropylene resin from Fina Oil and Chemical Co. Dallas, Tex./USA), 40.00 wt. % flexible polypropylene (available as Rexflex WL 101 from Huntsman Chemical Co., Houston, Tex./USA) and wt. 4.76% pastel green pigment dispersion 1:20 in polypropylene (available as Clariant 00078556 from Clariant Masterbatch GmbH, Lahnstein, Germany).

Comparative Example 5b

Comparative Example 5b was prepared by extruding a film comprising a mixture of 40.0% polypropylene resin (available as Fina 3374 polypropylene resin from Fina Oil and Chemical Co., Dallas, Tex./USA), 60.0 wt. % flexible polypropylene (available as Rexflex WL 101 from Huntsman Chemical Co., Houston, Tex./USA).

TABLE 7

Chemical Composition of Polymeric Films of Comparative Examples

| | | Polymer 1 | | | Polymer 2 | |
| --- | --- | --- | --- | --- | --- | --- |
| Ex. | Type | Trade-name | Wt. % | Type | Trade-name | Wt. % |
| C1 | Polyester | Vitel 3300 | 100.0 | — | — | — |
| C2 | Polyester | Vitel 1070 | 100.0 | — | — | — |
| C3 | Polyester | Vitel 1750 | 100.0 | — | — | — |
| C4 | Polyester | Vitel 1750 | 80.0 | Polyester | Vitel 1070 | 20.0 |
| C5a | PP | Fina 3576X | 55.23 | PP | Rexflex WL 101 | 40.00 |
| C5b | PP | Fina 3374 | 40.0 | PP | Rexflex WL 101 | 60.0 |

TABLE 8

Properties of Polymeric Films of Comparative Examples

| Ex. | Tensile 23° C., N/mm² | Elong. 23° C., % | E-mod., 23° C., N/mm² | Resid. stress 23° C., % | Strain rec., 23° C., % | Tensile 60° C., N/mm² | Elong 60° C., % | E-mod. 60° C., N/mm² | Resid. stress 60° C., % | Strain rec., 60° C., % | Drop in E-mod., % |
| --- | --- | --- | --- | --- | --- | --- | --- | --- | --- | --- | --- |
| C1 | 8.1 | 535 | 30 | 53 | 95 | >1.4 | >500 | 1 | 20 | — | 97 |
| C2 | * | * | * | * | * | * | * | * | * | * | * |
| C3 | 22.1 | 3 | 591 | — | — | >1.5 | >500 | 1 | 24 | — | >99 |
| C4 | 9.5 | 1 | 1,015 | — | — | >1.9 | >500 | 1 | 27 | 10 | >99 |
| C5b | 19.1 | 681 | 119 | 43 | 72 | — | >500 | 35 | 50 | 27 | 71 |

* Polymer too brittle to extrude a handleable film
— Not tested

TABLE 9

Pop-up Resistance of Adhesive-coated Polymeric Films

| Example | Simulated "Ashtray" Test | Corrugated Panel Test |
| --- | --- | --- |
| 1 | No lifting after 3 weeks | — |
| 2 | No lifting after 3 months | No lifting after 5 months |
| 3 | No lifting after 3 weeks | — |
| 4 | No lifting after 3 weeks | — |
| 5 | No lifting after 3 months | — |
| 16 | — | No lifting after 5 months |
| C5a | — | Lifting within 24 hours |

— not tested

What is claimed is:

1. A multi-layer sheet material comprising
   (i) a film of a polyester blend comprising a first and a second polyester, said polyesters being substantially amorphous, such that the film is capable of being softened at temperature in the range of about 40 to about 80° C. and exhibits a E-modulus in the range of 70 to 1000 N/mm² at room temperature, an elongation at break greater than 50% at room temperature and percent residual stress at 60° C. less than 40%, said film having a first major surface and a second major surface;

(ii) an adhesive layer on the first major surface of the film; and (iii) optionally, a release liner.

2. A multi-layer sheet material according to claim 1, wherein the first polyester has a Tg less than 26° C. and the second polyester has a Tg greater than 24° C.

3. A multi-layer sheet material according to claim 1, wherein the film exhibits a percent drop in E-modulus at room temperature to 60° C. of greater than 84%.

4. A multi-layer sheet material according to claim 1, wherein the film exhibits a percent strain recovery at 60° C. less than 15%.

5. An imaged graphic film comprising a multi-layer sheet material according to claim 1, wherein the film is imaged.

6. An imaged graphic film according to claim 5 adhered to a substrate.

7. An imaged graphic film adhered to a substrate according to claim 6, wherein the substrate is selected from the group consisting of a window, a building and a pavement.

8. An imaged graphic film adhered to a substrate according to claim 6, wherein the substrate has an irregular surface.

9. A vehicle comprising an imaged graphic film according to claim 5.

10. A graphic film comprising the multi-layer sheet material of claim 1.

11. An imaged graphic film adhered to a substrate according to claim 6, wherein the substrate has an uneven surface.

* * * * *

UNITED STATES PATENT AND TRADEMARK OFFICE
CERTIFICATE OF CORRECTION

PATENT NO. : 6,613,411 B2
DATED : September 2, 2003
INVENTOR(S) : Kollaja, Richard A.

It is certified that error appears in the above-identified patent and that said Letters Patent is hereby corrected as shown below:

<u>Title page,</u>
Item [56], References Cited, U.S. PATENT DOCUMENTS, delete "2,736,729" and insert in place thereof -- 2,736,721 --

<u>Column 1,</u>
Line 35, delete "of" following "wide".

<u>Column 2,</u>
Line 34, delete "temperature" and insert in place thereof -- temperatures --.

<u>Column 3,</u>
Lines 44-45, delete "an imaged graphic film adhered to a substrate,"

<u>Column 4,</u>
Line 53, delete "of" following "resins".

<u>Column 6,</u>
Line 33, insert -- be -- following "also".
Line 39, insert -- be -- following "may".

<u>Column 7,</u>
Line 35, delete "commerically" and insert in place thereof -- commercially --.
Line 58, delete "in form" and insert in place thereof -- in the form --.

<u>Column 8,</u>
Line 1, delete "preferaby" and insert place thereof -- preferably --
Line 12, delete "hydroybenzophenones;" and insert in place thereof -- hydroxybenzophenones; --.

<u>Column 9,</u>
Line 33, delete "the" following "are".
Line 50, delete "present include" and insert in place thereof -- present invention include --.
Linr 56, delete "than less" and insert in place thereof -- less than --.

<u>Column 10,</u>
Line 44, delete "require" and insert in place thereof -- requires --.
Line 50, delete "using" preceding "against".

UNITED STATES PATENT AND TRADEMARK OFFICE
CERTIFICATE OF CORRECTION

PATENT NO.   : 6,613,411 B2
DATED        : September 2, 2003
INVENTOR(S)  : Kollaja, Richard A.

It is certified that error appears in the above-identified patent and that said Letters Patent is hereby corrected as shown below:

Column 11,
Line 7, delete "comprises" and insert in place thereof -- comprises the --.
Line 63, delete "layer" and insert in place thereof -- layer, --.

Column 12,
Line 65, delete "platten" and insert in place thereof -- platen --.

Column 13,
Line 2, delete "strip" and insert in place thereof -- strips --.

Column 15,
Line 20, delete "by" following "place".
Line 25, delete "8 Pop-Up" and insert in place thereof -- 2 Pop-Up --.

Column 16,
Line 22, delete "terpohner" and insert in place thereof -- terpolymer --.
Line 24, delete "dg/min" and insert in place thereof -- g/min --.
Lines 24-25, delete "contenet" and insert in place thereof -- content --.
Line 43, delete "Zeeospheres$^{TM}$" and insert in place thereof -- Zeospheres$^{TM}$ --.
Line 51, delete "Chimasorb" and insert in place thereof -- Chimassorb --.

Column 17,
Line 9, delete "Chimasorb" and insert in place thereof -- Chimassorb --.
Line 17, delete "filly" and insert in place thereof -- fully --.
Line 56, delete "it" and insert in place thereof -- its --.

Column 18,
Line 3, delete "surfaced" and insert in place thereof -- surface --.
Line 13, delete "surface" and insert in place thereof -- surfaces --.
Lines 20-21, delete "Examples 1" and insert in place thereof -- Examples 1-5 --.
Table 2, delete "Ten." and insert in place thereof -- Tens. --.

UNITED STATES PATENT AND TRADEMARK OFFICE
CERTIFICATE OF CORRECTION

PATENT NO. : 6,613,411 B2
DATED : September 2, 2003
INVENTOR(S) : Kollaja, Richard A.

It is certified that error appears in the above-identified patent and that said Letters Patent is hereby corrected as shown below:

<u>Column 22,</u>
Table 8, delete "Elong 60' C., %" and insert in place thereof -- Elong 60º C., % --.

Signed and Sealed this

Thirtieth Day of March, 2004

JON W. DUDAS
*Acting Director of the United States Patent and Trademark Office*